(12) United States Patent
Iwadate et al.

(10) Patent No.: US 11,267,961 B2
(45) Date of Patent: Mar. 8, 2022

(54) RESIN COMPOSITION AND RESIN MOLDED BODY

(71) Applicant: FUJIFILM BUSINESS INNOVATION CORP., Tokyo (JP)

(72) Inventors: Yuko Iwadate, Minamiashigara (JP); Masayuki Okoshi, Minamiashigara (JP); Hiroyuki Moriya, Minamiashigara (JP); Tsuyoshi Miyamoto, Minamiashigara (JP); Daisuke Nakayama, Minamiashigara (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 252 days.

(21) Appl. No.: 16/252,102

(22) Filed: Jan. 18, 2019

(65) Prior Publication Data
US 2019/0153203 A1 May 23, 2019

Related U.S. Application Data

(63) Continuation of application No. PCT/JP2017/012454, filed on Mar. 27, 2017.

(30) Foreign Application Priority Data

Sep. 28, 2016 (JP) .............................. JP2016-190264

(51) Int. Cl.
*C08L 23/12* (2006.01)
*C08L 77/00* (2006.01)
(Continued)

(52) U.S. Cl.
CPC ................ *C08L 23/12* (2013.01); *C08J 5/04* (2013.01); *C08K 7/06* (2013.01); *C08L 23/00* (2013.01); *C08L 23/26* (2013.01); *C08L 77/00* (2013.01); *C08K 3/04* (2013.01); *C08K 2201/004* (2013.01); *C08L 2205/03* (2013.01); *C08L 2205/08* (2013.01)

(58) Field of Classification Search
CPC .................................... C08L 23/12; C08J 5/04
See application file for complete search history.

(56) References Cited

U.S. PATENT DOCUMENTS

| 5,283,284 A | 2/1994 | Brooks et al. |
| 2003/0092814 A1 | 5/2003 | Borgner et al. |
| 2017/0321019 A1 | 11/2017 | Fujita et al. |

FOREIGN PATENT DOCUMENTS

| CN | 102850783 B | 9/2016 |
| EP | 3 081 591 A1 | 10/2016 |

(Continued)

OTHER PUBLICATIONS

Jun. 27, 2017 International Search Report issued in International Patent Application No. PCT/JP2017/012454.
(Continued)

*Primary Examiner* — Arrie L Reuther
(74) *Attorney, Agent, or Firm* — Oliff PLC

(57) ABSTRACT

This resin composition includes: a polyolefin; carbon fibers having an average fiber length of 0.1 to 2.5 mm; a resin including at least one among an amide bond and an imide bond, the content of the resin with respect to 100 parts by mass of the polyolefin being greater than 20 parts by mass and less than or equal to 100 parts by mass; and a compatibilizer.

14 Claims, 2 Drawing Sheets

(51) Int. Cl.
    *C08K 7/06*     (2006.01)
    *C08L 23/26*     (2006.01)
    *C08J 5/04*     (2006.01)
    *C08L 23/00*     (2006.01)
    *C08K 3/04*     (2006.01)

(56) References Cited

FOREIGN PATENT DOCUMENTS

| | | |
|---|---|---|
| EP | 3 480 259 A1 | 5/2019 |
| EP | 3 480 260 A1 | 5/2019 |
| JP | H02-058552 A | 2/1990 |
| JP | H06-049295 A | 2/1994 |
| JP | H06-179815 A | 6/1994 |
| JP | 2003-528956 A | 9/2003 |
| JP | 2014-181307 A | 9/2014 |
| WO | 01/072883 A1 | 10/2001 |
| WO | 2016/076411 A1 | 5/2016 |

OTHER PUBLICATIONS

Jun. 27, 2017 Written Opinion of the International Searching Authority issued in International Patent Application No. PCT/JP2017/012454.

May 6, 2020 Extended Search Report issued in European Patent Application No. 17855223.8.

RESIN COMPOSITION AND RESIN MOLDED BODY

CROSS-REFERENCE TO RELATED APPLICATIONS

This is a continuation of International Application No. PCT/JP2017/012454 filed on Mar. 27, 2017 and claims priority from Japanese Patent Application No. 2016-190264 filed on Sep. 28, 2016.

BACKGROUND

Technical Field

The present invention relates to a resin composition and a resin molded body.

Related Art

Conventionally, resin compositions have been provided and used for various purposes.

Particularly, resin compositions containing a polyolefin as thermoplastic resins are used for components such as household electric appliances, various components of automobiles, casings, or casings of office equipment and electronic/electric appliances or the like.

For example, Patent Literature 1 discloses "a long fiber reinforced polyolefin structure having a length of 3 mm or more, containing: (a) 0.1 wt % to 90 wt % of at least one type of polyolefin; (b) 0.1 wt % to 50 wt % of at least one type of polyamide; (c) 0.1 wt % to 15 wt % of at least one modified polyolefin; (d) 5.0 wt % to 75 wt % of at least one type of reinforcing fiber; and (e) 0.1 wt % to 10 wt % of at least one type of sulfur-containing additive".

In addition, Patent Literature 2 discloses "a modifier for a polyolefin resin, containing a polymer (X), the polymer (X) containing an acid-modified polyolefin (A) block and a polyamide (B) block, and a ratio (a), measured by $^{13}$C-NMR, of carbon derived from an amide group to carbon derived from a methyl group, a methylene group and a methine group is 0.5/99.5 to 12/88". Further, Patent Literature 2 discloses "an inorganic fiber-containing polyolefin resin composition containing the polyolefin resin modifier (K), the polyolefin resin (D) and the inorganic fiber (E)."

CITATION LIST

Patent Literature

Patent Literature 1: JP-T-2003-528956
Patent Literature 2: JP-A-2014-181307

SUMMARY

Aspects of non-limiting embodiments of the present disclosure relate to provide a resin composition capable of obtaining a resin molded body excellent in tensile modulus compared with a case where in a resin composition containing a polyolefin, carbon fibers, a resin containing at least one of an amide bond and an imide bond and a compatibilizer, a content of the resin containing at least one of the amide bond and the imide bond is 20 parts by mass or less with respect to 100 parts by mass of the polyolefin.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a resin composition, containing:
a polyolefin;
carbon fibers having an average fiber length of 0.1 mm to 2.5 mm;
a resin containing at least one of an amide bond and an imide bond, a content of the resin with respect to 100 parts by mass of the polyolefin being greater than 20 parts by mass and less than or equal to 100 parts by mass; and
a compatibilizer.

BRIEF DESCRIPTION OF DRAWINGS

Exemplary embodiment(s) of the present invention will be described in detail based on the following figures, wherein.

DETAILED DESCRIPTION

Hereinafter, exemplary embodiments which are examples of a resin composition and a resin molded body of the present invention are described.

[Resin Composition]

The resin composition according to the exemplary embodiment contains a polyolefin, carbon fibers, a resin containing at least one of an amide bond and an imide bond and a compatibilizer. The content of the resin containing at least one of an amide bond and an imide bond with respect to 100 parts by mass of the polyolefin is greater than 20 parts by mass and less than or equal to 100 parts by mass.

Hereinafter, the resin containing at least one of an amide bond and an imide bond may be referred to as a "specific resin".

In recent years, in order to obtain a resin molded body excellent in mechanical strength, a resin composition containing a polyolefin as a base material (matrix) and a reinforcing fiber is used.

In such a resin composition, when the affinity between the reinforcing fiber and the polyolefin is low, a space is formed at the interface therebetween, and the adhesion at this interface sometimes decreases.

Particularly in a case where the carbon fibers are used as the reinforcing fiber in the resin composition, higher mechanical strength is required as compared with a glass fiber or the like, but polar groups contributing to adhesion to the polyolefin, such as hydroxyl group and carboxyl group, on the surface of the carbon fibers are fewer than those on the glass fiber, so that the adhesion at the interface between the carbon fibers and the polyolefin decreases. As a result, the mechanical strength, particularly the tensile modulus, is difficult to increase for the high blending ratio of the carbon fibers. Particularly in a case where repeated tensile load is applied, peeling at the interface between the carbon fibers and the polyolefin is likely to proceed, so that the decrease in the tensile modulus from the initial stage tends to increase.

Here, the resin composition according to the exemplary embodiment contains four components including: a polyolefin; carbon fibers; a resin (specific resin) containing at least one of an amide bond and an imide bond; and a compatibilizer. In addition, the content of the specific resin with respect to 100 parts by mass of the polyolefin is set to be greater than 20 parts by mass and less than or equal to 100 parts by mass.

Due to this configuration, a resin molded body excellent in tensile modulus may be obtained. Although the effect of obtaining such an effect is unclear, it is presumed as follows.

In obtaining a resin molded body from the resin composition according to the exemplary embodiment, when the resin composition is heat-molten and mixed, the polyolefin as the base material and the compatibilizer are melted, a part of the compatibilizer in the molecule and the amide bond and the imide bond contained in the molecule of the specific resin are compatible with each other and the specific resin is dispersed in the resin composition.

Figure 1:
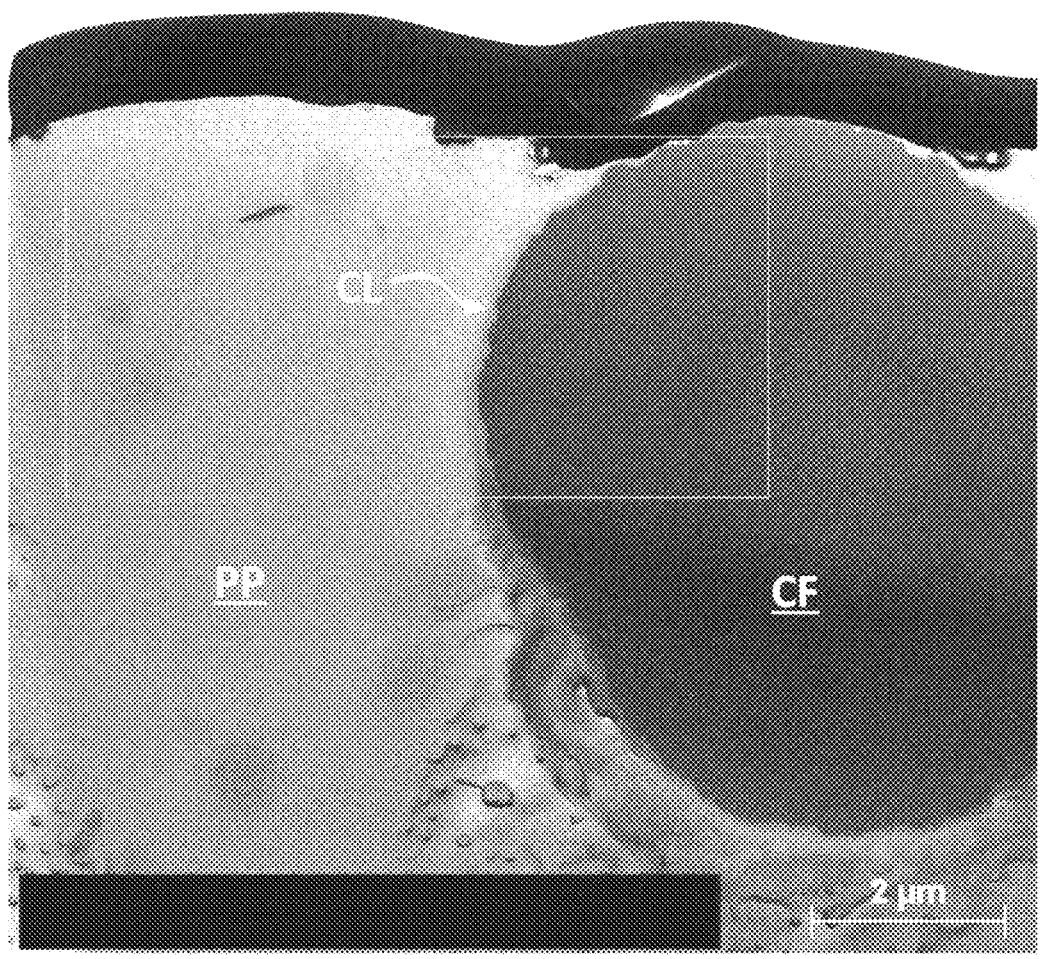
FIG. 1 is a model diagram showing a main part of a resin molded body according to the exemplary embodiment.

In this state, when the specific resin is in contact with the carbon fibers, amide bonds and imide bonds contained in a large number along the molecular chain of the specific resin and polar groups slightly present on the surface of the carbon fibers physically adhere at a plurality of sites with an affinity (attraction force and hydrogen bonds). In addition, since the polyolefin and the specific resin are generally less compatible, the frequency of contact between the specific resin and the carbon fibers increases by the repulsive force between the polyolefin and the specific resin, and as a result, the adhesion amount and adhesion area of the specific resin to the carbon fibers increase. Accordingly, a coating layer of the specific resin is formed around the carbon fibers (see FIG. 1). In FIG. 1, PP denotes a polyolefin, CF denotes a carbon fiber, and CL denotes a coating layer.

Further, the specific resin forming the coating layer is also compatible with a part of reactive groups in the molecule of the compatibilizer due to a chemical reaction and electrostatic interaction between polar groups, so that the compatibilizer is also compatible with the polyolefin, thereby the attractive force and the repulsive force are in equilibrium state, and the coating layer formed by the specific resin is formed in a thin and nearly uniform state. Particularly, since the affinity between the carboxy group present on the surface of the carbon fibers and the amide bond or the imide bond contained in the molecule of the specific resin is high, the coating layer of the specific resin is easily to be formed around the carbon fibers, and the coating layer is considered to be a thin film having excellent uniformity.

On the other hand, when a specific resin having such action is contained in a range of greater than 20 parts by mass and less than or equal to 100 parts by mass with respect to 100 parts by mass of the polyolefin, the amount of the compatibilizer becomes relatively small with respect to the amount of the specific resin, the specific resin is difficult to spread in the polyolefin, and the tendency to localize around the carbon fibers is enhanced. Accordingly, it is considered that the coating layer of the specific resin is formed in a state close to uniformity while thickening to some extent over the entire periphery of the carbon fibers.

Although it is preferable that the entire circumference of the carbon fibers is coated by the coating layer, there may be a portion which is not partially coated.

From the above, it is presumed that the adhesion of the interface between the carbon fibers and the polyolefin is enhanced, and a resin molded body excellent in mechanical strength, particularly tensile modulus, may be obtained.

Here, when the fiber length of the carbon fibers is shortened, the resin reinforcing ability of the carbon fibers tends to decrease. Particularly, due to recent demands for recycling, it is also being promoted to crush and recycle a resin molded body reinforced with carbon fibers, and the fiber length of the carbon fibers is often shortened when crushing the resin molded body. In addition, the fiber length of the carbon fibers may be shortened during heat-melt-kneading in producing the resin composition. Therefore, when a resin molded body is molded from a resin composition containing carbon fibers whose fiber length is shortened, the mechanical strength, particularly the tensile modulus, may tend to decrease.

However, even if a resin molded body containing carbon fibers is pulverized and a recycled product in which carbon fibers are made into short fibers is used as a raw material or carbon fibers are made short fibers during heat-melt-kneading, the resin composition according to the exemplary embodiment is useful because a resin molded body having excellent tensile modulus may be obtained.

Here, in the resin composition according to the exemplary embodiment and the resin molded body obtained therefrom, it is preferable that a coating layer of the specific resin is formed around the carbon fibers by heat-melt-kneading and injection molding in production of the resin composition (for example, pellets), and the coating layer has a thickness of 50 nm to 700 nm.

In the resin composition according to the exemplary embodiment, the thickness of the coating layer of the specific resin is 50 nm to 700 nm, and is preferably 50 nm to 650 nm from the viewpoint of further improvement of the tensile modulus. When the thickness of the coating layer is 50 nm or more, the tensile modulus is improved; when the thickness of the coating layer is 700 nm or less, the interface between the carbon fibers and the polyolefin may be prevented from becoming brittle via the coating layer and the reduction in tensile modulus may be suppressed.

The thickness of the coating layer is a value measured by the following method. An object to be measured is broken in liquid nitrogen, and the cross section thereof is observed using an electron microscope (VE-9800 manufactured by Keyence Corporation). On the cross section, the thickness of the coating layer to be coated around the carbon fibers is measured at 100 points, and an average value is calculated.

The coating layer is confirmed by observing the above cross section.

In the resin composition (and the resin molded body thereof) according to the exemplary embodiment, for example, a configuration is adopted in which the compatibilizer is partially dissolved between the coating layer and the polyolefin.

Figure 2:
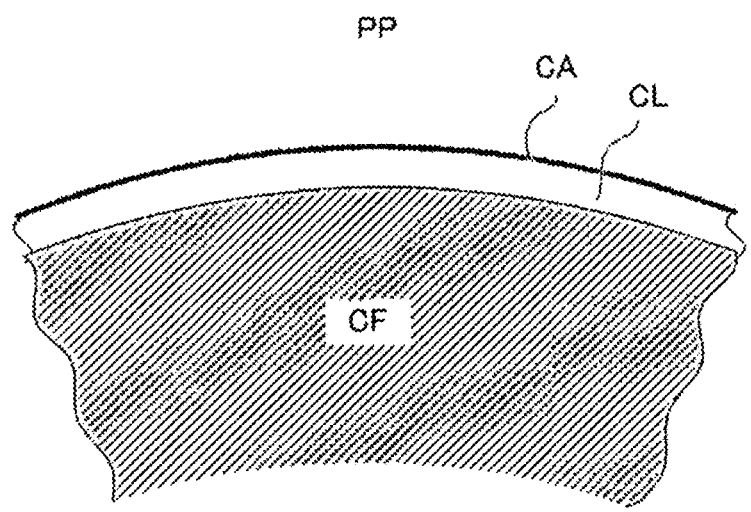
FIG. 2 is a pattern diagram for describing an example of the main part of the resin molded body according to the exemplary embodiment.

Specifically, for example, a layer of the compatibilizer is preferably interposed between the coating layer of the specific resin and the polyolefin as a base material (see FIG. 2). That is, a layer of the compatibilizer is formed on the surface of the coating layer, and the coating layer and the polyolefin are preferably adjacent to each other via the layer of the compatibilizer. The layer of the compatibilizer is formed to be thinner than the coating layer, and due to the interposition of the layer of the compatibilizer, the adhesion (adhesiveness) between the coating layer and the polyolefin is enhanced and a resin molded body excellent in mechanical strength, particularly the tensile modulus, may be easily obtained. In FIG. 2, PP represents a polyolefin, CF represents a carbon fiber, CL represents a coating layer, and CA represents a layer of a compatibilizer.

Particularly, the compatibilizer layer is preferably interposed between the coating layer and the polyolefin in a state of being bonded to the coating layer (via a hydrogen bond, a covalent bond by a reaction of functional groups of the compatibilizer and the specific resin, or the like) and compatible with the polyolefin. This configuration is easily realized, for example, when a compatibilizer having the same structure or compatible structure as the polyolefin as a base material and containing a site reactive with the above-mentioned functional groups of the specific resin in a part of the molecule is applied as the compatibilizer.

Specifically, for example, in a case where a polyolefin, a polyamide as the specific resin, and a maleic anhydride modified polyolefin as the compatibilizer are applied, it is preferable that in a layer of the maleic anhydride modified polyolefin (a layer of the compatibilizer), a carboxy group formed by ring opening of a maleic anhydride site reacts to bind with an amine residue of the layer of the polyamide (coating layer), and the polyolefin site is interposed in a compatible state with the polyolefin.

Here, a method for confirming that the layer of the compatibilizer is interposed between the coating layer and the polyolefin is as follows.

An infrared spectroscopic analyzer (NICOLET 6700 FT-IR, manufactured by Thermo Fisher Scientific Inc.) is used as an analyzer. For example, in a case of a resin composition (or a resin molded body) of polypropylene (hereinafter referred to as PP) as a polyolefin, PA 66 as a specific resin, and maleic modified polypropylene (hereinafter referred to as MA-PP) as a modified polyolefin, IR spectra of mixtures thereof, a mixture of PP and PA 66, a mixture of PP and MA-PP, a PP simple substance as a reference, a PA 66 simple substance, a simple substance of MA-PP are obtained by a KBr tablet method, and the peak areas derived from acid anhydride (peak characteristic to MA-PP) in the mixture ranging from a wave number of $1820\ cm^{-1}$ to $1750\ cm^{-1}$ are comparatively analyzed. In the mixture of PP, PA 66, and MA-PP, the decrease of the acid anhydride peak area are confirmed and it is thus confirmed that MA-PP and PA 66 react with each other. Accordingly, it may be confirmed that the layer of the compatibilizer (binding layer) is interposed between the covering layer and the polyolefin. In detail, when MA-PP is reacted with PA 66, the cyclic maleation moiety of MA-PP opens to chemically bond the amine residues of PA 66, thereby reducing the cyclic maleation moiety, so that it may be confirmed that the layer of the compatibilizer (binding layer) is interposed between the coating layer and the polyolefin.

Hereinafter, details of each component of the resin composition according to the exemplary embodiment are described.

—Polyolefin (A)—

The polyolefin is a base material of the resin composition and is a resin component reinforced by carbon fibers (also referred to as a matrix resin).

The polyolefin may be used alone, or may be used in combination of two or more types thereof.

The polyolefin may be a resin containing a repeating unit derived from an olefin and may contain a repeating unit derived from a monomer other than the olefin as long as it is not more than 30 mass % with respect to the whole resin.

The polyolefin may be obtained by addition polymerization of an olefin (if necessary, a monomer other than the olefin).

The olefin and the monomer other than the olefin to obtain the polyolefin may be one kind or two or more kinds, respectively.

The polyolefin may be a copolymer or a homopolymer. In addition, the polyolefin may be linear or branched.

Here, examples of the olefin include a linear or branched aliphatic olefin and an alicyclic olefin.

Examples of the aliphatic olefin include an α-olefin such as ethylene, propylene, 1-butene, 1-hexene, 4-methyl-1-pentene, 1-octene, 1-decene, 1-hexadecene, and 1-octadecene.

In addition, examples of the alicyclic olefin include cyclopentene, cycloheptene, norbornene, 5-methyl-2-norbornene, tetracyclododecene, vinylcyclohexane, or the like.

Of these, the α-olefin is preferred, the ethylene and propylene are more preferred, and the propylene is particularly preferred, from the viewpoint of the cost.

As the monomer other than the olefin, a known addition polymerizable compound is selected.

Examples of the addition polymerizable compound include: styrenes such as styrene, methylstyrene, α-methylstyrene, β-methylstyrene, t-butylstyrene, chlorostyrene, chloromethylstyrene, methoxystyrene, styrenesulfonic acid or a salt thereof; (meth)acrylates such as alkyl (meth) acrylate, benzyl (meth)acrylate and dimethylaminoethyl (meth)acrylate; halovinyls such as vinyl chloride; vinyl esters such as vinyl acetate and vinyl propionate; vinyl ethers such as vinyl methyl ether; vinylidene halides such as vinylidene chloride; N-vinyl compounds such as N-vinyl pyrrolidone; or the like.

Examples of suitable polyolefins include a polypropylene (PP), a polyethylene (PE), a polybutene, a polyisobutylene, a coumarone-indene resin, a terpene resin, an ethylene-vinyl acetate copolymer resin (EVA) or the like.

Of these, a resin containing only repeating units derived from an olefin is preferred, and particularly from the viewpoint of the cost, the polypropylene is preferred.

The molecular weight of the polyolefin is not particularly limited, and may be determined according to the type of the resin, molding conditions, the application of the resin molded body, or the like. For example, the weight average molecular weight (Mw) of the polyolefin is preferably in the range of 10,000 to 300,000, and more preferably in the range of 10,000 to 200,000.

In addition, similar to the above molecular weight, the glass transition temperature (Tg) or the melting point (Tm) of the polyolefin is not particularly limited, and may be determined according to the kind of the resin, molding conditions, the application of the resin molded body, or the like. For example, the melting point (Tm) of the polyolefin is preferably in the range of 100° C. to 300° C., and more preferably in the range of 150° C. to 250° C.

The weight average molecular weight (Mw) and the melting point (Tm) of the polyolefin are values measured as follows.

That is, the weight average molecular weight (Mw) of the polyolefin is determined by gel permeation chromatography (GPC) under the following conditions. A high temperature GPC system "HLC-8321 GPC/HT" is used as a GPC device, and o-dichlorobenzene is used as an eluent. The polyolefin is melted and filtered into the o-dichlorobenzene at a high temperature (a higher temperature of 140° C. to 150° C.), and the filtrate is used as a measurement sample. As measurement conditions, the sample concentration is 0.5%, the flow rate is 0.6 ml/min, and the sample injection volume is 10 μl. The measurement is performed using an RI detector. In addition, a calibration curve is prepared from 10 samples of "polystylene standard sample TSK standard" manufactured by Tosoh Corporation: "A-500", "F-1", "F-10", "F-80", "F-380", "A-2500", "F-4", "F-40", "F-128", and "F-700".

The melting temperature (Tm) of the polyolefin is obtained by the "melting peak temperature" described in the method of obtaining the melting temperature of JIS K 7121-1987 "Method for Measuring Transition Temperature of Plastics", from a DSC curve obtained by differential scanning calorimetry (DSC).

The content of the polyolefin may be determined according to the application of the resin molded body or the like, and is, for example, preferably 5 mass % to 95 mass %, more preferably 10 mass % to 95 mass %, and further preferably 20 mass % to 95 mass %, with respect to the total mass of the resin composition.

—Carbon Fibers—

As the carbon fibers, a known carbon fiber is used, and both a PAN-based carbon fiber and a pitch-based carbon fiber are used.

The carbon fibers may be one subjected to known surface treatment.

Examples of the surface treatment for the carbon fibers include oxidation treatment and sizing treatment.

The form of the carbon fibers is not particularly limited, and may be selected according to the application of the resin molded body or the like. Examples of the form of the carbon fibers include a fiber bundle composed of a large number of single fibers, a bundled fiber bundle, a woven fabric in which fibers are woven in two dimensions or three dimensions, or the like.

The fiber diameter, fiber length, and the like of the carbon fibers are not particularly limited, and may be selected according to the application of the resin molded body or the like.

However, since a resin molded body excellent in tensile modulus may be obtained even if the fiber length of the carbon fibers is short, the average fiber length of the carbon fibers is preferably 0.1 mm to 2.5 mm (preferably 0.2 mm to 2.0 mm).

In addition, the average diameter of the carbon fibers may be, for example, 5.0 μm to 10.0 μm (preferably 6.0 μm to 8.0 μm).

Here, a method for measuring the average fiber length of the carbon fibers is as follows. The carbon fibers are observed with an optical microscope at a magnification of 100 and the length of the carbon fibers is measured. Then, this measurement is performed on 200 carbon fibers, and the average value thereof is taken as the average fiber length of the carbon fibers.

Here, a method for measuring the average diameter of the carbon fibers is as follows. A section orthogonal to the longitudinal direction of the carbon fibers is observed with a SEM (scanning electron microscope) at a magnification of 1000 times, and the diameters of the carbon fibers are measured. Then, this measurement is performed on 100 carbon fibers, and the average value thereof is taken as the average diameter of the carbon fibers.

A commercially available product may be used as the carbon fiber.

Examples of commercially available products of the PAN-based carbon fiber include "Torayca (registered trademark)" manufactured by Toray Industries, Inc., "Tenax" manufactured by Toho Tenax Co., Ltd., and "Pyrofil (registered trademark)" manufactured by Mitsubishi Rayon Co., Ltd. Other commercially available products of the PAN-based carbon fiber include commercial products manufactured by Hexcel, Cytec, Dow-Aksa, Taiwan Plastic, and SGL.

Examples of commercially available products of the pitch-based carbon fiber include "DIALEAD (registered trademark)" manufactured by Mitsubishi Rayon Co., Ltd., "GRANOC" manufactured by Nippon Graphite Fiber Co., Ltd., and "KRECA" manufactured by Kureha Corporation. Other commercially available products of the pitch-based carbon fiber include commercially available products manufactured by Osaka Gas Chemicals Co., Ltd and Cytec Industries.

The carbon fibers may be used alone, or may be used in combination of two or more types thereof.

The content of the carbon fibers is preferably 0.1 part by mass to 200 parts by mass, more preferably 1 part by mass to 180 parts by mass, and still more preferably 5 parts by mass to 150 parts by mass, with respect to 100 parts by mass of the polyolefin as a base material.

When the content of the carbon fibers is 0.1 part by mass or more with respect to 100 parts by mass of the polyolefin, reinforcement of the resin composition is achieved; when the content of the carbon fibers is 200 parts by mass or less with respect to 100 parts by mass of the polyolefin, the moldability at the time of obtaining the resin molded body is improved.

When reinforcing fibers other than the carbon fibers are used, it is preferable to use the carbon fibers in an amount of 80 mass % or more with respect to the total mass of the reinforcing fibers.

Here, the content (parts by mass) with respect to 100 parts by mass of the polyolefin is sometimes abbreviated as "phr (per hundred resin)".

When this abbreviation is used, the content of the carbon fibers is 0.1 phr to 200 phr.

—Resin Containing at Least One of Amide Bond and Imide Bond (Specific Resin)—

The specific resin includes a specific partial structure and is a resin that may cover the periphery of the carbon fibers as described above.

The specific resin is described in detail.

The specific resin is preferably a resin having a low compatibility with a polyolefin, specifically, a resin having a different solubility parameter (SP value) from that of the polyolefin.

Here, a difference in SP value between the polyolefin and the specific resin is preferably 3 or more, and more preferably 3 to 6, from the viewpoint of compatibility between the polyolefin and the specific resin and repulsive force therebetween.

The SP value here is a value calculated by the Fedor's method. Specifically, the solubility parameter (SP value) is calculated according to the description of, for example, Polym. Eng. Sci., Vol. 14, p. 147 (1974) by the following equation.

$$SP \text{ value} = \sqrt{(Ev/v)} = \sqrt{(\Sigma \Delta ei/\Sigma \Delta vi)} \quad \text{Equation:}$$

(in the Equation, Ev: vaporization energy (cal/mol), v: molar volume ($cm^3$/mol), $\Delta ei$: evaporation energy of each atom or atomic group, and $\Delta vi$: molar volume of each atom or atomic group)

The solubility parameter (SP value) adopts $(cal/cm^3)^{1/2}$ as a unit, but the unit is omitted according to the practice and the notation is expressed in dimensionless.

In addition, the specific resin contains at least one of an amide bond and an imide bond in the molecule.

When an amide bond or an imide bond is contained, the affinity is exhibited with the polar group present on the surface of the carbon fibers.

Specific examples of the specific resin include a thermoplastic resin containing at least one of an amide bond and an imide bond in the main chain, specifically a polyamide (PA), a polyimide (PI), a polyamide imide (PAI), a polyetherimide (PEI), a polyamino acid, or the like.

Since the specific resin has low compatibility with a polyolefin and the SP value is preferably different, it is preferable to use a thermoplastic resin different from the polyolefin.

Of these, a polyamide (PA) is preferred from the viewpoints of further improvement of the tensile modulus and excellent adhesion to the carbon fibers.

Here, the adhesion between the specific resin and the carbon fibers is evaluated by an index such as interfacial shear strength.

Figure 3:
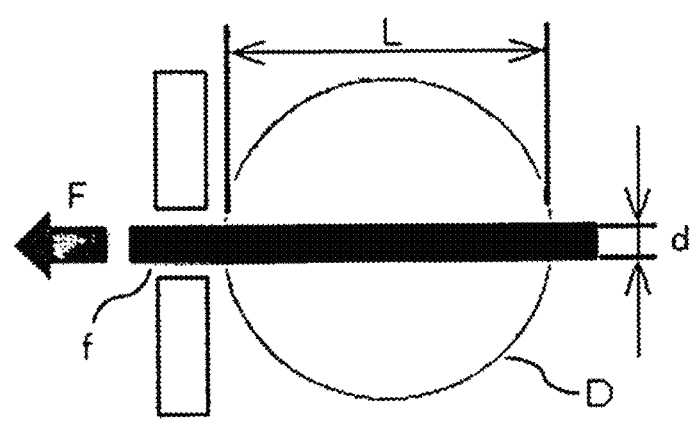
FIG. 3 is a pattern diagram of a test using a micro-droplet method.

The interfacial shear strength is measured using a micro-droplet method. Here, the micro-droplet method is described with reference to the pattern diagram of the test shown in FIG. 3.

The micro-droplet method is a method of evaluating the interfacial adhesiveness between the polyamide and the carbon fibers by applying a liquid resin to a monofilament f, attaching a droplet D (also called a resin particle or resin bead), fixing the droplet D, and then conducting a drawing test for the single fiber fin the arrow direction.

Then, based on the test, the interfacial shear strength ($\tau$) is calculated using the following equation.

$$\tau = \frac{F}{d\pi L}$$ [Equation 1]

In the equation, $\tau$ represents interfacial shear strength, F represents a drawing load, d represents a fiber diameter of the single fiber, and L represents a droplet length.

It is an index indicating that the larger the value of the calculated interfacial shear strength ($\tau$) is, the higher the adhesion between the carbon fibers and the specific resin is. By selecting a combination of the carbon fibers and the resin having a large value, a resin molded body having a higher tensile modulus is formed.

Examples of the polyamide include those obtained by co-polycondensation of a dicarboxylic acid and a diamine, and those obtained by ring-opening polycondensation of a lactam.

Examples of the dicarboxylic acid include oxalic acid, adipic acid, suberic acid, sebacic acid, terephthalic acid, isophthalic acid, 1,4-cyclohexanedicarboxylic acid, malonic acid, succinic acid, glutaric acid, pimelic acid, azelaic acid, phthalic acid, or the like. Of these, adipic acid and terephthalic acid are preferred.

Examples of the diamine include ethylenediamine, pentamethylenediamine, hexamethylenediamine, nonanediamine, decamethylenediamine, 1,4-cyclohexanediamine, p-phenylenediamine, m-phenylenediamine, m-xylenediamine, or the like. Of these, hexamethylenediamine is preferred.

Examples of the lactam include ε-caprolactam, undecane lactam, lauryl lactam, or the like. Of these, ε-caprolactam is preferred.

From the viewpoints of the affinity (adhesiveness) with the carbon fibers, and the moldability of the resin molded body, the polyamide is preferably a polyamide (PA 6) obtained by ring-opening polycondensation of ε-caprolactam, 6.6 nylon, 6.10 nylon, 1 to 12 nylons, MXD known as aromatic nylon, HT-1m, 6-T nylon, a polyaminotriazole, a polybenzimidazole, a polyoxadiazole, a polyamide imide, and a piperazine-based polyimide. Of these, 6.6 nylon is preferred.

The molecular weight of the specific resin is not particularly limited as long as it is easier to thermally melt than the polyolefin coexisting in the resin composition. For example, if the specific resin is a polyamide, the weight average molecular weight thereof is preferably in the range of 10,000 to 300,000, and more preferably in the range of 10,000 to 100,000.

In addition, similar to the above molecular weight, the glass transition temperature or the melting temperature (melting point) of the specific resin is not particularly limited, as long as it is easier to thermally melt than the polyolefin coexisting in the resin composition. For example, if the specific resin is a polyamide, the melting point (Tm) thereof is preferably in the range of 100° C. to 400° C., and more preferably in the range of 150° C. to 350° C.

The content of the specific resin is preferably greater than 20 parts by mass and less than or equal to 100 parts by mass, and from the viewpoint of improvement of the tensile modulus, is preferably 30 parts by mass to 90 parts by mass, and more preferably 40 parts by mass to 80 parts by mass, with respect to 100 parts by mass of the polyolefin.

From the viewpoint of improvement of the tensile modulus, the content of the specific resin with respect to the mass of the carbon fibers is preferably 0.1 mass % to 200 mass %, more preferably 10 mass % to 150 mass %, and still more preferably 12 mass % to 120 mass %.

When the content of the specific resin with respect to the mass of the carbon fibers is 0.1 mass % or more, the affinity between the carbon fibers and the specific resin tends to be increased; when the content of the specific resin with respect to the mass of the carbon fibers is 200 mass % or less, the resin flowability is improved.

—Compatibilizer—

The compatibilizer is a resin that enhances the affinity between the polyolefin and the specific resin.

The compatibilizer may be determined according to the polyolefin.

The compatibilizer is preferably one having the same structure as or compatible with the polyolefin and containing a site having an affinity with the above-mentioned specific resin in a part of the molecule or a site reactive with the functional group of the specific resin.

Specifically, a modified polyolefin is preferably used as the compatibilizer.

Here, if the polyolefin is a polypropylene (PP), a modified polypropylene (PP) is preferably used as the modified polyolefin, and similarly, if the polyolefin is an ethylene-vinyl acetate copolymer resin (EVA), a modified ethylene-vinyl acetate copolymer resin (EVA) is preferably used as the modified polyolefin.

Examples of the modified polyolefin include a polyolefin into which a modification site including a carboxy group, a carboxylic acid anhydride residue, a carboxylic acid ester residue, an imino group, an amino group, an epoxy group or the like is introduced.

From the viewpoints of further improvement of the affinity between the polyolefin and the specific resin and the upper limit temperature during the molding process, the modification site introduced into the polyolefin preferably contains a carboxylic acid anhydride residue, and particularly preferably contains a maleic anhydride residue.

The modified polyolefin may be obtained by a method of directly chemically bonding by reacting a compound containing the above-mentioned modification site with a polyolefin, a method of forming a graft chain using the above-mentioned compound containing a modification site and bonding the graft chain to a polyolefin, or the like.

Examples of the above-mentioned compound containing a modification site include maleic anhydride, fumaric anhydride, citric anhydride, N-phenyl maleimide, N-cyclohexyl maleimide, glycidyl (meth)acrylate, glycidyl vinyl benzoate, N-[4-(2,3-epoxypropoxy)-3,5-dimethylbenzyl] acrylamide, an alkyl (meth)acrylate, and derivatives thereof.

Of these, a modified polyolefin obtained by reacting maleic anhydride which is an unsaturated carboxylic acid with a polyolefin is preferred.

Specific examples of the modified polyolefin include acid modified polyolefins such as a maleic anhydride modified polypropylene, a maleic anhydride modified polyethylene, a maleic anhydride modified ethylene vinyl acetate copolymer resin (EVA), and adducts or copolymer thereof.

As the modified polyolefin, a commercially available product may be used.

Examples of the modified propylene include Yumex (registered trademark) series (100 TS, 110 TS, 1001, and 1010) manufactured by Sanyo Chemical Industries, Ltd., or the like.

Examples of the modified polyethylene include Yumex (registered trademark) series (2000) manufactured by Sanyo Chemical Industries, Ltd., MODIC (registered trademark) series manufactured by Mitsubishi Chemical Corporation, or the like.

Examples of the modified ethylene-vinyl acetate copolymer resin (EVA) include MODIC (registered trademark) series manufactured by Mitsubishi Chemical Corporation or the like.

The molecular weight of the compatibilizer is not particularly limited, and is preferably in the range of 5,000 to 100,000, and more preferably in the range of 5,000 to 80,000, from the viewpoint of processability.

The content of the compatibilizer is preferably 1 part by mass to 50 parts by mass, more preferably 2 part by mass to 40 parts by mass, and still more preferably 5 parts by mass to 30 parts by mass, with respect to 100 parts by mass of the polyolefin.

The content of the compatibilizer is preferably 1 part by mass to 100 parts by mass, more preferably 5 part by mass to 70 parts by mass, and still more preferably 10 parts by mass to 50 parts by mass, with respect to 100 parts by mass of the specific resin.

When the content of the compatibilizer is within the above range, the affinity between the polyolefin and the specific resin is enhanced, and the tensile modulus is improved.

The content of the compatibilizer with respect to the mass of the carbon fibers is preferably 1 mass % to 100 mass %, more preferably 5 mass % to 70 mass %, and still more preferably 10 mass % to 50 mass %.

When the content of the compatibilizer with respect to the mass of the carbon fibers is 1 mass % or more, the affinity between the carbon fibers and the specific resin is easily obtained. When the content of the compatibilizer with respect to the mass of the carbon fibers is 100 mass % or less, the residual unreacted functional groups which cause discoloration and deterioration are suppressed.

The resin composition according to the exemplary embodiment is preferably a non-crosslinked resin composition in which the resin component constituting the resin composition is not crosslinked. When the resin component is crosslinked, the movement of the resin component in the resin composition is restricted, and it may be difficult to form a coating layer of the polyamide around the carbon fibers.

—Other Components—

The resin composition according to the exemplary embodiment may contain other components in addition to each of the above components.

Examples of other components include well-known additives such as a flame retardant, a flame retardant, a flame retardant aid, a sludge preventing agent when heated, a plasticizer, an antioxidant, a releasing agent, a light fastness agent, a weathering agent, a colorant, a pigment, a modifier, an antistatic agent, a hydrolysis inhibitor, a filler, and a reinforcing agent other than carbon fibers (talc, clay, mica, glass flakes, milled glass, glass beads, crystalline silica, alumina, silicon nitride, aluminum nitride, boron nitride, etc.).

The other components are preferably 0 part by mass to 10 parts by mass, more preferably 0 part by mass to 5 parts by mass with respect to 100 parts by mass of the polyolefin, for example. Here, "0 part by mass" means a form not containing other components.

(Method for Producing Resin Composition)

The resin composition according to the exemplary embodiment is produced by melt-kneading each of the above components.

Here, known means is used as means for melt kneading, and examples thereof include a twin-screw extruder, a Henschel mixer, a Banbury mixer, a single screw extruder, a multi-screw extruder, a co-kneader or the like.

The temperature at the time of melt-kneading (cylinder temperature) may be determined according to the melting point of the resin component constituting the resin composition or the like.

Particularly, the resin composition according to the exemplary embodiment is preferably obtained by a production method including a step of melt-kneading a polyolefin, carbon fibers, a specific resin, and a compatibilizer. When the polyolefin, the carbon fibers, the specific resin and the compatibilizer are melt-kneaded all at once, a coating layer of the specific resin is easily formed around the carbon fibers in a thin and nearly uniform state, and the tensile modulus is increased.

[Resin Molded Body]

The resin molded body according to the exemplary embodiment contains, a polyolefin, carbon fibers, a resin (specific resin) containing at least one of an amide bond and an imide bond and a compatibilizer. The content of the resin containing at least one of an amide bond and an imide bond with respect to 100 parts by mass of the polyolefin is greater than 20 parts by mass and less than or equal to 100 parts by mass. That is, the resin molded body according to the exemplary embodiment has the same composition as the resin composition according to the exemplary embodiment.

The resin molded body according to the exemplary embodiment is preferably a non-crosslinked resin molded body made of a non-crosslinked resin composition in which the resin component constituting the resin composition is not crosslinked. When the resin component is crosslinked, the movement of the resin component in the resin composition is restricted, and it may be difficult to form a coating layer of the polyamide around the carbon fibers.

The resin molded body according to the exemplary embodiment may be obtained by preparing the resin composition according to the exemplary embodiment and the molding the resin composition, or may be obtained by preparing a composition containing components other than carbon fibers and mixing such a composition and carbon fibers at the time of molding.

As for the molding method, for example, injection molding, extrusion molding, blow molding, hot press molding, calender molding, coating molding, cast molding, dipping molding, vacuum molding, transfer molding and the like may be applied.

The method for forming a resin molded body according to the exemplary embodiment is preferably injection molding from the viewpoint of a high degree of freedom of shape.

The cylinder temperature of injection molding is, for example, 180° C. to 300° C., and preferably 200° C. to 280° C. The mold temperature of the injection molding is, for example, 30° C. to 100° C., and more preferably 30° C. to 60° C.

Injection molding may be performed using commercially available devices such as NEX 150 manufactured by NISSEI PLASTIC INDUSTRIAL CO., LTD., NEX 300 manufactured by NISSEI PLASTIC INDUSTRIAL CO., LTD., and SE50D manufactured by Sumitomo Heavy Industries, Ltd., for example.

The resin molded body according to the exemplary embodiment is suitably used for applications such as electronic and electrical equipment, office equipment, household electric appliances, automotive interior materials, containers, and the like. More specifically, casings of electronic and electric equipment and household electric appliances; various parts of electronic and electric equipment and household electrical appliances; interior parts of automobiles; storage cases of CD-ROM and DVD; dishes; beverage bottles; food trays; wrapping materials; films; sheets; or the like.

Particularly, since the resin molded body according to the exemplary embodiment uses carbon fibers as the reinforcing fibers, a resin molded product more excellent in mechanical strength may be obtained. Therefore, the resin molded body is suitable for substitute application to metal parts.

Examples

The present invention will be specifically described below with reference to examples, but the present invention is not limited to these Examples.

Examples 1 to 12 and Comparative Examples 1 to 13

The components according to Tables 1 to 2 (the numerical values in the table indicate the number of parts) were kneaded in a twin-screw kneader (TEM 58SS, manufactured by TOSHIBA MACHINE CO., LTD.) under the following kneading conditions and melt-kneading temperatures (cylinder temperatures) shown in Tables 1 to 2, to obtain pellets of resin compositions. The obtained pellets were calcined at 600° C. for 2 hours, and the average fiber length of the remaining carbon fibers was measured by the method described above. The measurement results are shown in Tables 1 to 2.

—Kneading Conditions—
Screw diameter: φ 58 mm
Rotation speed: 300 rpm (50 rpm only in Comparative Example 5)
Discharge nozzle diameter: 1 mm (2 mm only in Comparative Example 5)

The obtained pellets were molded into an ISO multipurpose dumbbell test piece (corresponding to ISO 527 tensile test and ISO 178 bending test) (test part thickness of 4 mm and width of 10 mm) and a D2 test piece (length of 60 mm, width of 60 mm, and thickness of 2 mm) at the injection molding temperature (cylinder temperature) shown in Tables 1 to 2 and the mold temperature of 50° C. by an injection molding machine (NEX 150 manufactured by NISSEI PLASTIC INDUSTRIAL CO., LTD.).

[Evaluation]

The following evaluations were performed using the obtained two test pieces. The evaluation results are shown in Tables 1 to 2.

—Tensile Modulus and Elongation—

With respect to the ISO multipurpose dumbbell test piece obtained, the tensile modulus and the elongation were measured by a method according to ISO 527 using an evaluation device (precision universal testing machine Autograph AG-IS 5 kN, manufactured by Shimadzu Corporation).

—Flexural Modulus—

With respect to the ISO multipurpose dumbbell test piece obtained, the flexural modulus was measured by a method complying with ISO 178 using a universal testing device (Autograph AG-Xplus, manufactured by Shimadzu Corporation).

—Heat Distortion Temperature (HDT)—

With respect to the ISO multipurpose dumbbell test piece obtained, the heat distortion temperature (° C.) at a load of 1.8 MPa was measured by a method in accordance with the ISO 178 bending test using a HDT measuring device (HDT-3 manufactured by Toyo Seiki Seisaku-sho).

—Dimensional Change Rate—

The obtained D2 test piece was allowed to stand under the conditions of 28° C. and 31% RH for 24 hours, and the dimensional change rates (%) of the test piece before and after standing were measured for the test piece in each of the TD direction and the MD direction.

The dimensional change was measured with a microscopic length measuring device (STM 6-LM, manufactured by Olympus Corporation).

—Presence or Absence of Coating Layer—

Using the obtained D2 test piece, presence or absence of a coating layer of the specific resin was confirmed according to the method described above.

TABLE 1

| Com-positions | | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|---|
| Thermoplastic resin | Polypropylene | 100 | 100 | 100 | 100 | 100 | 100 | 100 | 100 | 100 | | 35 | 49 |
| | Polyethylene | | | | | | | | | | 100 | | |
| | EVA | | | | | | | | | | | | |
| Reinforcing fiber | Carbon fiber (with surface treatment) | 10 | 50 | 200 | 10 | 200 | | 10 | 200 | 10 | 200 | 30 | 50 |
| | Carbon fiber (no surface treatment) | | | | | | 10 | | | | | | |
| Specific resin | Polyamide (PA 6) | 22 | 60 | 100 | | | | | | | 100 | | |
| | Polyamide (PA 66) | | | | 21 | 100 | 23 | | | | | | |
| | Polyamide (PA 1010) | | | | | | | 25 | 100 | 21 | | | |
| | Polyamide (MXD 6) | | | | | | | | | | | | |
| | Polyamide (PA 9T) | | | | | | | | | | | 30 | 20 |
| Compatibilizer | Maleic anhydride modified polypropylene | 0.25 | 6 | 50 | 0.22 | 50 | 0.25 | 0.25 | 50 | 0.22 | | 5 | 10 |
| | Maleic anhydride modified polyethylene | | | | | | | | | | 50 | | |
| | Maleic anhydride modified EVA | | | | | | | | | | | | |
| Conditions | Total | 132.25 | 216 | 450 | 131.22 | 450 | 133.25 | 135.25 | 450 | 131.22 | 450 | 100 | 129 |
| | Melt-kneading temperature (°C) | 260 | 260 | 260 | 290 | 290 | 290 | 220 | 220 | 260 | 260 | 240 | 240 |
| | Injection molding temperature (°C) | 260 | 260 | 260 | 290 | 290 | 290 | 220 | 220 | 260 | 260 | 240 | 240 |
| Evaluation | Tensile modulus (Gpa) | 6 | 19.5 | 31 | 5.5 | 32 | 5.2 | 5.5 | 30 | 5 | 30 | 28 | 28 |
| | Elongation (%) | 1.8 | 2.2 | 2.4 | 1.8 | 2.8 | 1.5 | 1.4 | 2 | 2.4 | 1.4 | 2 | 2.2 |
| | Flexural modulus (Gpa) | 5.4 | 18.5 | 28.6 | 4.2 | 29.4 | 5 | 5.1 | 27.4 | 6 | 26.8 | 26 | 26 |
| | Heat distortion temperature (HDT) (°C) | 155 | 165 | 168 | 170 | 177 | 150 | 124 | 130 | 146 | 144 | 118 | 116 |
| | Dimensional change rate TD/MD (%) | 0.4/0.3 | 0.4/0.3 | 0.4/0.3 | 0.2/0.1 | 0.2/0.1 | 0.2/0.1 | 0.6/0.4 | 0.5/0.4 | 0.5/0.4 | 0.7/0.6 | 0.2/0.4 | 0.3/0.2 |
| | Presence or absence of coating layer | Presence | Presence | Presence | Presence | Presence | Presence | Presence | Presence | Presence | Presence | Presence | Presence |
| | Average fiber length (mm) | 0.7 | 0.7 | 0.7 | 0.7 | 0.7 | 0.7 | 0.7 | 0.7 | 0.7 | 0.7 | 0.7 | 0.7 |
| Note | Amount of specific resin with respect to 100 parts of thermoplastic resin (part) | 22 | 60 | 100 | 21 | 100 | 23 | 25 | 100 | 21 | 100 | 86 | 41 |
| | Amount of compatibilizer with respect to 100 parts of specific resin (part) | 1.1 | 10.0 | 50.0 | 1.0 | 50.0 | 1.1 | 1.0 | 50.0 | 1.0 | 50.0 | 16.7 | 50.0 |
| | Amount of carbon fiber in resin molded body | 7.6% | 23.1% | 44.4% | 7.6% | 44.4% | 7.5% | 7.4% | 44.4% | 7.6% | 44.4% | 30.0% | 38.8% |

TABLE 2

| | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 | Comparative Example 12 | Comparative Example 13 |
|---|---|---|---|---|---|---|---|---|---|---|---|---|---|---|
| Compositions | Thermoplastic resin | Polypropylene | 200 | 100 | 100 | 200 | 100 | 100 | 100 | 100 | 100 | 100 | 100 | 100 | 100 |
| | | Polyethylene | | | | | | | | | | | | | |
| | | EVA | | | | | | | | | | | | | |
| | Reinforcing fiber | Carbon fiber (with surface treatment) | 10 | 220 | 35 | 11 | 30 | | | | 5 | 25 | 100 | | |
| | | Carbon fiber (no surface treatment) | | | | | | | | | | | | | |
| | Specific resin | Polyamide (PA 6) | 20 | 120 | 20 | 40 | | | 0.1 | 20 | | | | 25 | 25 |
| | | Polyamide (PA 66) | | | | | | | | | | | | | |
| | | Polyamide (PA 1010) | | | | | | | | | | | | | |
| | | Polyamide (MXD 6) | | | | | | | | | | | | | |
| | | Polyamide (PA 9T) | | | | | | | | | | | | | |
| | Compatibilizer | Maleic anhydride modified polypropylene | 0.2 | 60 | 0.1 | 30 | | | 0.1 | 20 | | | | 20 | |
| | | Maleic anhydride modified polyethylene | | | | | | | | | | | | | |
| | | Maleic anhydride modified EVA | | | | | | | | | | | | | |
| | Total | | 230.2 | 500 | 155.1 | 281 | 130 | 100 | 100.2 | 140 | 105 | 125 | 200 | 145 | 125 |
| Conditions | Melt-kneading temperature (° C.) | | 260 | 260 | 260 | 260 | 260 | 200 | 200 | 200 | 200 | 200 | 200 | 200 | 200 |
| | Injection molding temperature (° C.) | | 260 | 260 | 260 | 260 | 200 | 270 | 270 | 270 | 270 | 270 | 270 | 270 | 270 |
| Evaluation | Tensile modulus (Gpa) | | 2.3 | 26 | 13 | 3.2 | 3.2 | 1.1 | 1.1 | 1.2 | 1.5 | 5.8 | Unable to mold | 1.8 | 1.3 |
| | Elongation (%) | | 4 | 4.2 | 3.8 | 4 | 5.6 | 82 | 56 | 16 | 9 | 2.1 | Unable to mold | 12 | 10 |
| | Flexural modulus (Gpa) | | 20 | 22 | 10 | 2.8 | 1.5 | 1.3 | 1.3 | 1.4 | 1.5 | 5.8 | Unable to mold | 1.6 | 1.6 |
| | Heat distortion temperature (HDT) (° C.) | | 144 | 156 | 155 | 148 | 145 | 98 | 99 | 108 | 125 | 145 | 184 | 118 | 122 |
| | Dimensional change rate TD/MD (%) | | 2.4/1.8 | 2.2/1.4 | 1.4/1.0 | 0.9/0.6 | 5.5/4.8 | 1.1/0.98 | 1.2/1.2 | 1.0/0.9 | 0.8/0.7 | 0.5/0.6 | 0.2/0.1 | 0.4/0.5 | 0.3/0.2 |
| | Presence or absence of coating layer | | Presence | Presence | Presence | Presence | Absence | Absence | Absence | Absence | Absence | Absence | Absence | Absence | Absence |
| Note | Average fiber length (mm) | | 0.7 | 0.7 | 0.7 | 0.7 | 0 | 0 | 0.1 | 0.7 | 0 | 0.7 | 0.7 | 0.7 | 0.7 |
| | Amount of specific resin with respect to 100 parts of thermoplastic resin (part) | | 10 | 120 | 20 | 20 | 0 | 0 | 0.1 | 20 | 0 | 0 | 0 | 25 | 25 |
| | Amount of compatibilizer with respect to 100 parts of specific resin (part) | | 1.0 | 50.0 | 0.5 | 75.0 | 0.0 | 0.0 | 100.0 | 100.0 | 0.0 | 0.0 | 0.0 | 80.0 | 0.0 |
| | Amount of carbon fiber in resin molded body | | 4.3% | 44.0% | 22.6% | 3.9% | 23.1% | 0.0% | 0.0% | 0.0% | 4.8% | 20.0% | 50.0% | 0.0% | 0.0% |

Details of the types of the materials in Tables 1 to 2 are as follows.

—Thermoplastic Resin—

Polypropylene (Novatec (registered trademark) PP MA3, manufactured by Japan Polypropylene Corporation), SP value: 9.3

Polyethylene (ULTZEX 20100J, manufactured by Prime Polymer Co., Ltd.), SP value: 8.0

EVA: Ethylene-vinyl acetate copolymer resin (41X, manufactured by Du Pont-Mitsui Polychemicals Co., Ltd.), SP value: 10.0

—Reinforcing Fiber—

Carbon fiber (with surface treatment, chopped carbon fiber Torayca (registered trademark), manufactured by Toray Industries, Inc.; average fiber length of 20 mm, and average diameter of 7 μm)

Carbon fiber (no surface treatment, with the above chopped carbon fiber tracer (registered trademark) dipping in a solvent to remove a sizing agent)

—Specific Resin—

Polyamide PA 6 (PA 6, Zytel (registered trademark) 7331J, manufactured by Dupont), SP value: 13.6

Polyamide PA 66 (PA 66, 101L, manufactured by Dupont), SP value: 11.6

Polyamide PA 1010 (PA 1010, Hiprolon 200, manufactured by Arkema S.A.)

Polyamide MXD 6 (MXD 6, manufactured by Mitsubishi Gas Chemical Company, Inc.)

Polyamide PA 9T (Nylon 9T, GENESTAR PA 9T, manufactured by KURARAY CO., LTD.)

—Compatibilizer—

Maleic anhydride modified polypropylene (Yumex (registered trademark) 110 TS, manufactured by Sanyo Chemical Industries, Ltd.)

Maleic anhydride modified polyethylene (MODIC M142 manufactured by Mitsubishi Chemical Corporation)

Maleic anhydride modified EVA: maleic anhydride modified ethylene

Vinyl acetate copolymer resin (MODIC A543, manufactured by Mitsubishi Chemical Corporation)

It is understood that from the above results, in the exemplary Example, a molded body excellent in tensile modulus may be obtained even when the fiber length of the carbon fibers is short as compared with that in the Comparative Example.

When the molded body produced in each Example was analyzed by the method described above, it was confirmed that a layer of the compatibilizer used (a layer of the maleic anhydride modified polypropylene, a layer of the maleic anhydride modified polyethylene, and a layer of the maleic anhydride modified ethylene-vinyl acetate copolymer resin (EVA)) was interposed between the coating layer and the polyolefin (a layer of the compatibilizer is formed on the surface of the coating layer).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising:
a polyolefin;
carbon fibers having an average fiber length of 0.1 mm to 2.5 mm;
a polyamide, a content of the polyamide with respect to 100 parts by mass of the polyolefin being greater than 20 parts by mass and less than or equal to 100 parts by mass; and
an acid-modified polyolefin, a content of the acid-modified polyolefin being 10 parts by mass to 50 parts by mass with respect to 100 parts by mass of the polyamide, wherein the acid modification is with maleic anhydride.

2. The resin composition according to claim 1,
wherein the polyamide forms a coating layer around the carbon fibers.

3. The resin composition according to claim 2,
wherein a layer of the acid-modified polyolefin is interposed between the coating layer and the polyolefin.

4. The resin composition according to claim 1,
wherein a content of the carbon fibers is 0.1 part by mass to 200 parts by mass with respect to 100 parts by mass of the polyolefin.

5. The resin composition according to claim 1,
wherein a content of the polyamide is 0.1 mass % to 200 mass % with respect to the mass of the carbon fibers.

6. The resin composition according to claim 1,
wherein the content of the compatibilizer acid-modified polyolefin is 1 mass % to 100 mass % with respect to the mass of the carbon fibers.

7. The resin composition according to claim 1,
wherein the resin composition is a non-crosslinked resin composition.

8. A resin molded body, comprising:
a polyolefin;
carbon fibers having an average fiber length of 0.1 mm to 2.5 mm;
a polyamide, a content of the polyamide with respect to 100 parts by mass of the polyolefin being greater than 20 parts by mass and less than or equal to 100 parts by mass; and
an acid-modified polyolefin, a content of the acid-modified polyolefin being 10 parts by mass to 50 parts by mass with respect to 100 parts by mass of the polyamide, wherein the acid modification is with maleic anhydride.

9. The resin molded body according to claim 8,
wherein the polyamide forms a coating layer around the carbon fibers.

10. The resin molded body according to claim 9,
wherein a layer of the acid-modified polyolefin is interposed between the coating layer and the polyolefin.

11. The resin molded body according to claim 8,
wherein a content of the carbon fibers is 0.1 part by mass to 200 parts by mass with respect to 100 parts by mass of the polyolefin.

12. The resin molded body according to claim 8,
wherein a content of the polyamide is 0.1 mass % to 200 mass % with respect to the mass of the carbon fibers.

13. The resin molded body according to claim 8,
wherein the content of the acid-modified polyolefin is 1 mass % to 100 mass % with respect to the mass of the carbon fibers.

14. The resin composition according to claim 8, wherein the resin molded body is a non-crosslinked resin molded body.

\* \* \* \* \*